(12) United States Patent
Talley et al.

(10) Patent No.: US 9,746,013 B2
(45) Date of Patent: Aug. 29, 2017

(54) SPRING STEEL WIRE HARNESS CLIP

(71) Applicants: Steven L Talley, Detroit, MI (US); Tuan V Nguyen, Sterling Heights, MI (US); Jeromy Tomlin, New Baltimore, MI (US); Dennis Turpin, Evansville, MI (US)

(72) Inventors: Steven L Talley, Detroit, MI (US); Tuan V Nguyen, Sterling Heights, MI (US); Jeromy Tomlin, New Baltimore, MI (US); Dennis Turpin, Evansville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/065,019

(22) Filed: Mar. 9, 2016

(65) Prior Publication Data

US 2016/0265566 A1    Sep. 15, 2016

Related U.S. Application Data

(60) Provisional application No. 62/131,529, filed on Mar. 11, 2015.

(51) Int. Cl.
| | |
|---|---|
| *F16B 2/24* | (2006.01) |
| *F16M 13/02* | (2006.01) |
| *B60R 16/02* | (2006.01) |
| *F16B 2/20* | (2006.01) |

(52) U.S. Cl.
CPC ............ *F16B 2/24* (2013.01); *B60R 16/0215* (2013.01); *F16M 13/02* (2013.01); *F16B 2/20* (2013.01); *F16B 2/241* (2013.01)

(58) Field of Classification Search
CPC .... F16B 2/20; F16B 2/24; F16B 2/241; F16B 2/10; F16B 2/06; F16B 2/04; F16B 2/02; F16L 3/00; F16M 13/02
USPC ......................................... 248/549, 300, 301
See application file for complete search history.

(56) References Cited

U.S. PATENT DOCUMENTS

| | | | | |
|---|---|---|---|---|
| 2,578,639 | A | * 12/1951 | Bedford, Jr. ............ | F16B 2/245 403/162 |
| 3,869,760 | A | * 3/1975 | Meyer .................... | F16B 2/245 24/562 |
| 3,922,764 | A | * 12/1975 | Downing, Jr. ............ | E04B 2/60 24/350 |
| 3,977,640 | A | * 8/1976 | Arnold ................... | H02G 3/125 174/58 |

(Continued)

FOREIGN PATENT DOCUMENTS

WO    WO2012022663    2/2012

*Primary Examiner* — Nkeisha Smith
(74) *Attorney, Agent, or Firm* — Ralph E Smith

(57) ABSTRACT

A mounting clip and a mounting assembly include a mounting structure and the mounting clip. The mounting structure includes a mounting feature. The mounting clip includes a base, an inferior leg, and a catch. The base has a through hole therein. The inferior leg is disposed on an anterior side of the base. The catch is disposed on a posterior side of the base. The inferior leg and the catch are configured to engage the mounting structure when the mounting clip is assembled to the mounting structure, such that the mounting feature is accessible through the through hole when the mounting clip is assembled to the mounting structure. The mounting clip also includes a superior leg having a mounting aperture.

15 Claims, 4 Drawing Sheets

(56) References Cited

U.S. PATENT DOCUMENTS

| | | | |
|---|---|---|---|
| 5,211,521 A * | 5/1993 | Page | F16B 5/0642 411/182 |
| 6,027,360 A | 2/2000 | Jenkins | |
| 6,085,615 A | 7/2000 | Kirkendall | |
| 6,844,496 B2 | 1/2005 | Matsuda et al. | |
| 6,956,172 B2 * | 10/2005 | Dinh | H02G 3/125 174/53 |
| 7,086,125 B2 * | 8/2006 | Slobodecki | B60R 13/0206 24/293 |
| 7,291,024 B2 | 11/2007 | Kiyota et al. | |
| 7,306,191 B1 * | 12/2007 | Chen | F04D 25/088 248/220.22 |
| 7,635,443 B2 | 12/2009 | Peterson et al. | |
| 8,221,042 B2 | 7/2012 | Vitali | |
| 2005/0175407 A1 * | 8/2005 | Demel | F16B 2/241 403/408.1 |
| 2010/0219305 A1 * | 9/2010 | Lloyd | B01D 46/001 248/201 |
| 2011/0219588 A1 * | 9/2011 | Inoue | F16B 5/065 24/458 |
| 2013/0199963 A1 * | 8/2013 | Garfinkle | A47F 3/14 206/557 |
| 2013/0216303 A1 * | 8/2013 | Tang | H05K 7/1405 403/326 |
| 2016/0115987 A1 * | 4/2016 | Kwon | E05B 79/06 248/27.3 |

\* cited by examiner

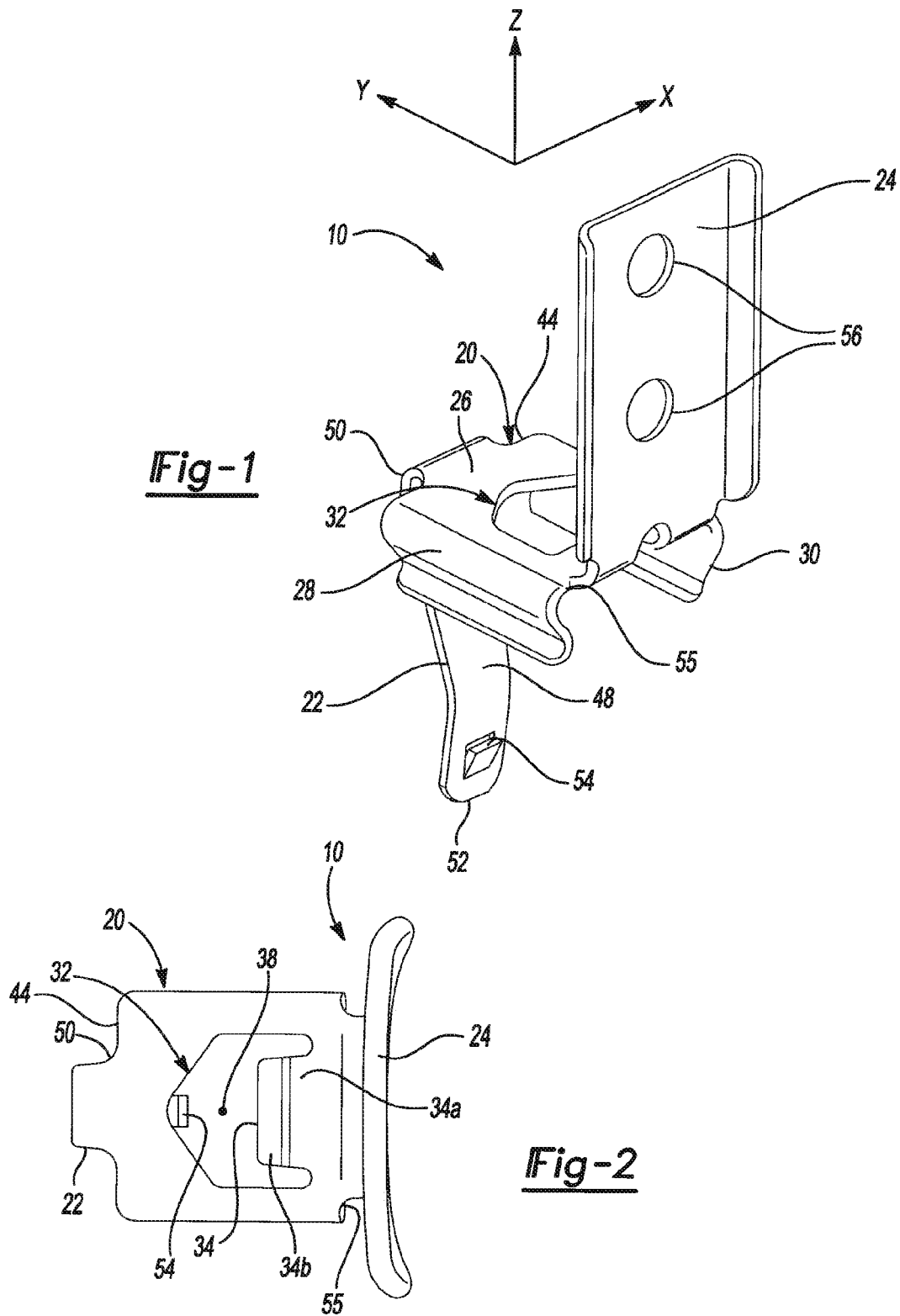

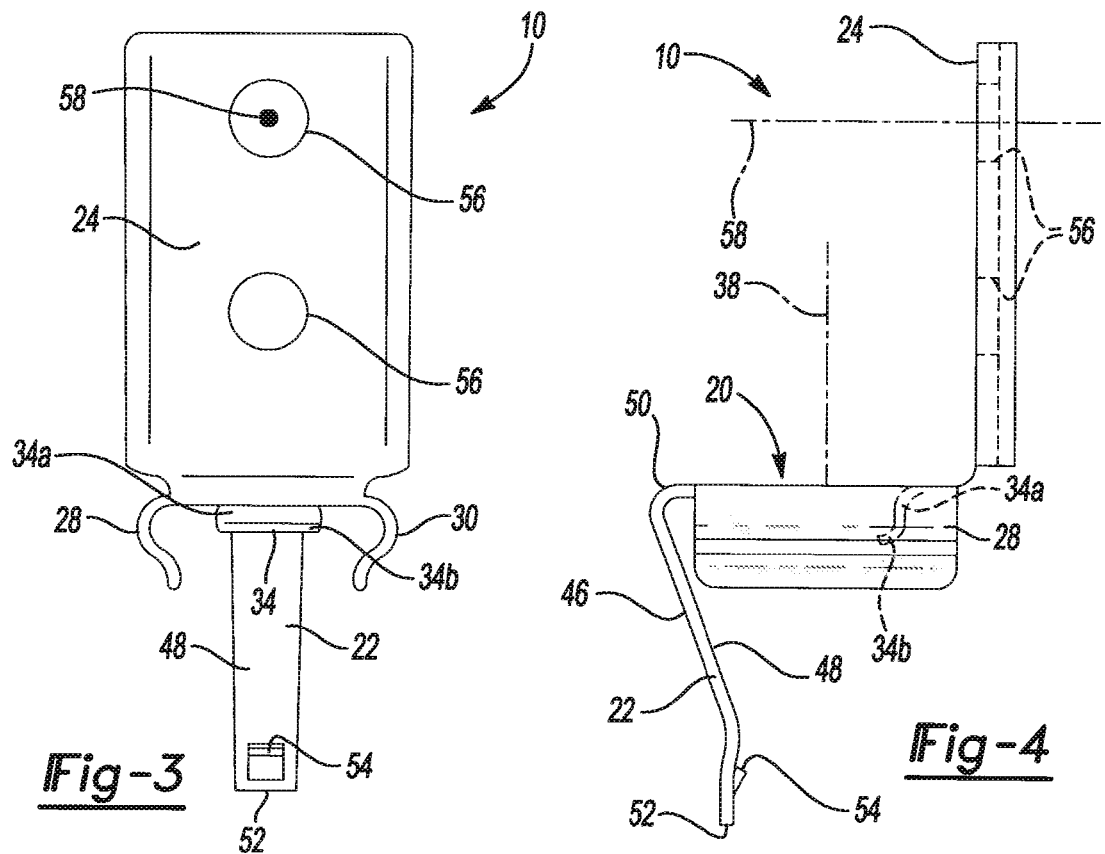
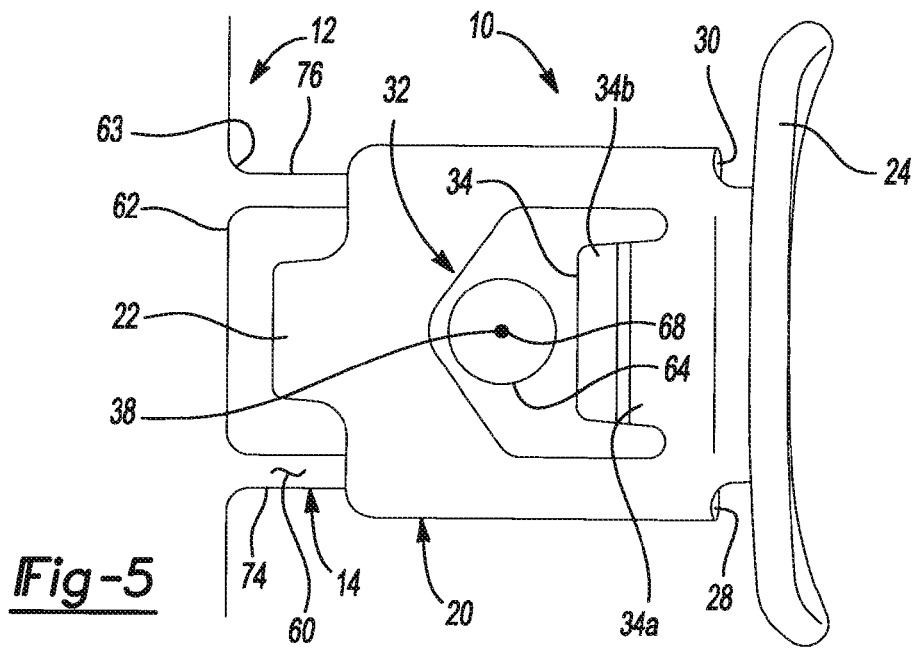

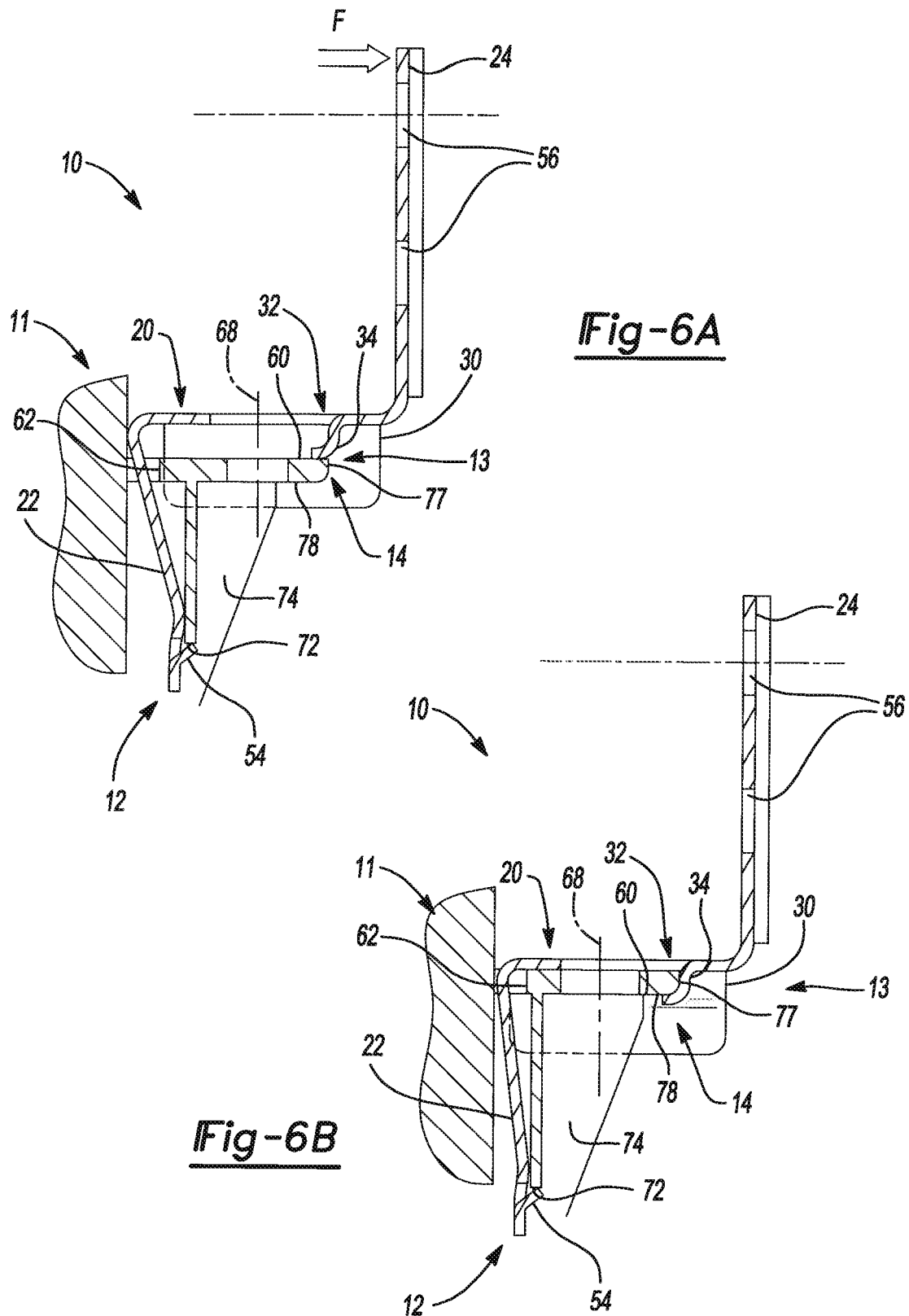

SPRING STEEL WIRE HARNESS CLIP

CROSS-REFERENCE TO RELATED APPLICATIONS

This application claims the benefit of U.S. Provisional Application No. 62/131,529, filed on Mar. 11, 2015. The entire disclosure of the above application is incorporated herein by reference.

FIELD

The present disclosure relates to a clip or bracket, and more particularly to a clip or bracket for mounting a wire harness, such as an oxygen sensor wire harness, to a support structure, such as an engine.

BACKGROUND

Clips and brackets are used to mount, or otherwise secure, various components to one another. In a motor vehicle, mounting clips and mounting brackets are used to couple various components or subassemblies, such as trim panels, wire harnesses, and engine subassemblies, to various other portions of the vehicle, such as a chassis or an engine. For example, clips and brackets is used to reduce the footprint or amount of space required to package a component or subassembly by holding or securing a first component or subassembly in position such that it does not contact or interfere with a second component or subassembly. Often there are a limited number of attachment points on the chassis, engine, or other mounting location to which the various components or subassemblies is secured. In this regard, in some situations, the number of components or subassemblies that require mounting may be greater than the number of available mounting locations.

While known mounting clips and brackets have generally proven to be acceptable for their intended purposes, a continuous need for improvement in the relevant art remains. In this regard, it may be desirable to provide a mounting clip or bracket that allows a user to quickly mount first and second components to a portion of a vehicle (e.g., an engine, a chassis, a body panel, etc.).

SUMMARY

The present disclosure provides a mounting clip and a mounting assembly. The mounting assembly includes a mounting structure. The mounting structure includes a mounting feature. The mounting clip includes a base, an inferior leg, and a catch. The base has a through hole therein. The inferior leg is disposed on an anterior side of the base. The catch is disposed on a posterior side of the base. The inferior leg and the catch are configured to engage the mounting structure when the mounting clip is assembled to the mounting structure, such that the mounting feature is accessible through the through hole when the mounting clip is assembled to the mounting structure. The mounting clip also includes a superior leg having a mounting aperture.

In some configurations, the through hole of the base is larger than the aperture of the mounting structure In some configurations, the mounting clip is constructed from a resilient material.

In some configurations, the resilient material includes a spring steel.

In some configurations, the mounting clip is monolithically formed.

In some configurations, the inferior leg and the catch are disposed on opposite sides of the mounting structure when the mounting clip is attached to the mounting structure.

The present disclosure also provides a mounting assembly. The mounting assembly includes a mounting structure, a mounting clip, a first component, and a second component. The mounting structure includes a mounting feature. The mounting clip is supported by the mounting structure and includes a mounting clip having a base and a superior leg. The base includes a through hole that is aligned with the mounting feature of the mounting structure such that the mounting feature is accessible through the through hole. The superior leg is supported by the base and extends in a superior direction. The superior leg includes a mounting aperture. The first component includes a portion extending through the through hole and is mounted to the mounting feature of the mounting structure. The second component is mounted to the mounting aperture of the superior leg.

In some configurations, the mounting assembly includes a wire harness attached to the first and second components.

In some configurations, the mounting feature of the mounting structure includes a second through hole in the mounting structure.

In some configurations, the through hole in the base of the mounting clip includes a first central axis, and the second through hole in the mounting structure includes a second central axis parallel to the first central axis.

In some configurations, a portion of the first component is disposed in the first and second through holes.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a perspective view of a mounting clip or bracket in accordance with the principles of the present disclosure;

FIG. 2 is a top side view of the mounting bracket of FIG. 1;

FIG. 3 is a rear side elevation view of the mounting bracket of FIG. 1;

FIG. 4 is a lateral side elevation view of the mounting bracket of FIG. 1;

FIG. 5 is a top side environmental view of the mounting bracket of FIG. 1 in an assembled configuration;

FIG. 6A is a cross-sectional view of the mounting bracket of FIG. 1 in a partially assembled configuration;

FIG. 6B is a cross-sectional view of the mounting bracket of FIG. 1 in a fully assembled configuration;

DETAILED DESCRIPTION

Figure 7:
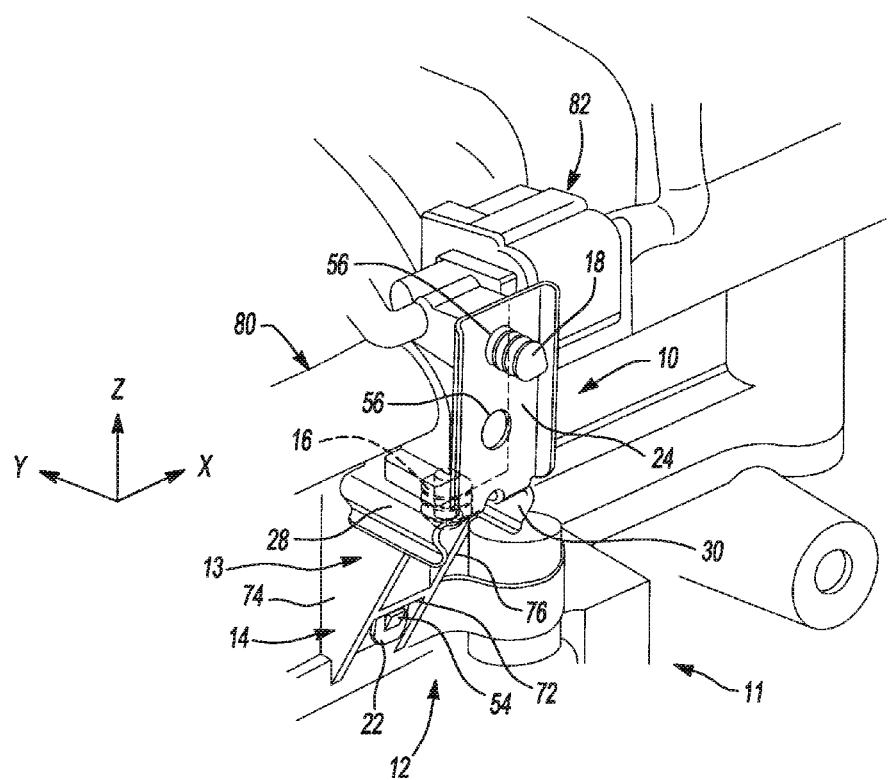
FIG. 7 is a perspective environmental view of the mounting bracket of FIG. 1 in a fully assembled configuration, and showing first and second components supported proximate the mounting bracket.

With reference to FIG. 1, a mounting bracket or clip 10 is shown. The mounting clip 10 attaches to a support structure 11 having a mounting structure 13, (FIG. 7) and the mounting clip is used to secure a subassembly or component 16 to the support structure 11. In this regard, and with reference to FIGS. 5-7, in some configurations the support structure 11 is a portion of an automobile or other vehicle (not shown), such as an engine 12, a chassis, or a body panel, for example, and the mounting clip 10 is used to secure a component to a portion of the vehicle. As will be explained in more detail below, in some configurations the mounting clip 10 is attached to a portion of the engine 12, such as an engine mounting pedestal 14, for example, such that a first component 16 (e.g., a clip, a stud, a bolt, a screw, etc.) is also attached to, or otherwise supported by, the engine mounting pedestal 14 and a portion of the mounting clip 10, and a second component 18 (e.g., a clip, a stud, a bolt, a screw, etc.) is attached to, or otherwise supported, by another portion of the mounting clip 10 (FIG. 7). In such configurations, the engine mounting pedestal 14 is considered the above referenced mounting structure and the engine 12 is considered the above referenced support structure.

The mounting clip 10 includes a seat 20, an inferior leg 22 that extends downwardly from seat 20 and a superior leg 24 that extends upwardly from seat 20. The seat 20, the inferior leg 22, and the superior leg 24 are integrally formed such that the mounting clip 10 defines a monolithic construct. In this regard, the mounting clip 10 is manufactured from a metallic material using a stamping process. Specifically, the mounting clip 10 is manufactured from a flexible, or otherwise resilient, material having spring-like characteristics. For example, in some configurations, the mounting clip 10 is formed from spring steel.

The seat 20 includes a base 26, lateral support arms 28, 30, a through hole or aperture 32, and a catch 34. The base 26 defines a generally planar shape, such that in an assembled configuration (FIGS. 5 and 6B) the base 26 extends in a horizontal direction. The lateral support arms 28, 30 are disposed on, and extend along and from, opposed lateral sides of the base 26 with one of the lateral support arms disposed on one of the opposed lateral sides of base 26 and the other lateral support arm disposed on the other opposed lateral side of base 26. In this regard, the lateral support arms 28, 30 extend downwardly or inferiorly from the base 26. As illustrated in FIG. 3, in some configurations, the lateral arms 28, 30 extend downwardly from the base 26 in an arcuate or S-shaped manner. As will be explained in more detail below, when mounting clip 10 is attached to mounting pedestal 14, the first and second lateral support arms 28, 30 help secure or otherwise prevent movement of the mounting clip 10 relative to the mounting pedestal 14 along an X-axis (FIGS. 5 and 7).

The aperture 32 is formed in the base 26 between the first and second lateral support arms 28, 30. With reference to FIG. 2, the aperture 32 includes a central axis 38. As illustrated in FIG. 2, the aperture 32 is defined by an inner peripheral surface 36 of the seat 20. In this regard, it will be appreciated the inner peripheral surface 36 of the seat 20 faces, or is otherwise exposed to, the aperture 32. As will be explained in more detail below, when mounting clip 10 is attached to mounting pedestal 14, the aperture 32 allows a user to mount the first component 16 to the engine mounting pedestal 14.

The catch 34 extends downwardly and anteriorly from the base 26. In this regard, as illustrated in FIG. 2, the catch 34 includes a proximal portion 34a extending downwardly from the base 26, and a distal portion 34b extending anteriorly from the proximal portion 34a. As will be explained in more detail below, when mounting clip 10 is attached to mounting pedestal 14, the catch 34 helps to secure or otherwise prevent movement of the mounting clip 10 relative to the mounting pedestal 14 along a Y-axis and along a Z-axis (FIGS. 5 and 7). Specifically, the proximal portion 34a of the catch 34 prevents the mounting clip 10 from moving relative to the mounting pedestal 14 in the anterior direction along the Y-axis, and the distal portion 34b of the catch 34 prevents the mounting clip 10 from moving relative to the mounting pedestal 14 along the Z-axis.

The inferior leg 22 extends downwardly from the seat 20. Specifically, as illustrated in FIG. 4, the inferior leg 22 extends downwardly from an anterior side 44 of the seat 20. In this regard, the inferior leg 22 includes anterior and posterior sides 46, 48 extending from a proximal end 50 of the inferior leg 22 to a distal end 52 of the inferior leg 22. The proximal end 50 of the inferior leg 22 is supported by the seat 20. The distal end 52 of the inferior leg 22 includes a barb 54. The barb 54 extends in a posterior direction from the posterior side 48 of the inferior leg 22. As will be explained in more detail below, when mounting clip 10 is attached to mounting pedestal 14, in the assembled configuration, the inferior leg 22 helps to secure or otherwise prevent movement of the mounting clip 10 relative to the mounting pedestal 14 along the Y-axis (FIGS. 5 and 7). Specifically, the inferior leg 22 prevents the mounting clip 10 from moving relative to the mounting pedestal 14 in the posterior direction along the Y-axis. The barb 54 helps to secure or otherwise prevent movement of the mounting clip 10 relative to the mounting pedestal 14 along the Z-axis (FIG. 6B).

The superior leg 24 extends upwardly from the seat 20. Specifically, as illustrated in FIG. 4, the inferior leg 22 extends upwardly from a posterior side 55 of the seat 20. The superior leg 24 includes one or more mounting feature 56. As illustrated in FIG. 1, in some configurations the superior leg 24 includes two mounting features 56. It will be appreciated, however, that the superior leg 24 includes more than two mounting features 56 within the scope of the present disclosure. In some configurations the mounting feature 56 includes or otherwise defines an aperture in the superior leg 24. As illustrated in FIG. 4, the mounting feature 56 includes a central axis 58 extending in a direction substantially perpendicular to (+/−10 degrees) the central axis 38 of the aperture 32. As will be explained in more detail below, the second component 18 is mounted to or otherwise supported by the mounting feature 56.

With reference to FIGS. 5-7, a method of assembling or otherwise using the mounting clip 10 with a support structure will now be described. As indicated above, the support structure includes a portion of a vehicle, such as the engine 12, a chassis, or a body panel, for example. In one specific assembly method, the support structure includes the mounting pedestal 14 of the engine 12. As illustrated in FIG. 5, the mounting pedestal 14 includes a mounting surface 60 having an opening 62 at an end 63 adjacent engine 12 and a mounting feature or aperture 64 in a central portion of mounting surface 60. The aperture 64 includes a central axis 68.

To assemble the mounting clip 10 to the mounting pedestal 14, the user inserts the inferior leg 22 into the opening 62 until the barb 54 engages a surface 72 of the mounting pedestal 14, and the mounting clip 10 is disposed in a partially assembled position (FIG. 6A). In this regard, as discussed above, the barb 54 helps to secure the mounting clip 10 to the mounting pedestal 14 or otherwise prevent the mounting clip 10 from moving along the Z-axis. As illustrated in FIG. 6A, in the partially assembled position the catch 34 engages the mounting surface 60, and the first and second lateral support arms 28, 30 are disposed along opposed lateral sides 74, 76, respectively, of the mounting pedestal 14. In this regard, as discussed above, the first and second lateral support arms 28, 30 prevent the mounting clip 10 from moving relative to the mounting pedestal 14 along the X-axis.

To complete the assembly of the mounting clip 10 to the mounting pedestal 14, the user applies a force F to the mounting clip 10 along the Y-axis and along the Z-axis. Specifically, the user applies the force F to the superior leg 24, such that the superior leg 24 is biased away from the inferior leg 22. In this regard, it will be appreciated that the resiliency of the mounting clip 10 will allow the mounting clip to bend or flex in response to the force F. When the force F has reached a sufficient value, the catch 34 will disengage from the mounting surface 60. Thereafter, when the force F is removed, the proximal portion 34a of the catch 34 engages a posterior surface 77 of the mounting pedestal 14, and the distal portion 34b of the catch 34 engages an inferior surface 78 (opposite the mounting surface 60) of the mounting pedestal 14. In this regard, as discussed above, it will be appreciated that in the fully assembled position (FIGS. 6B and 7) the proximal portion 34a of the catch 34 prevents the mounting clip 10 from moving relative to the mounting pedestal 14 along the Y-axis, and the distal portion 34b of the catch 34 prevents the mounting clip 10 from moving relative to the mounting pedestal 14 along the Z-axis.

In the fully assembled position, the aperture 32 of the base 26 is aligned with the aperture 64 of the mounting pedestal 14 so that the aperture 64 in the mounting pedestal 14 is accessible through the aperture 32 in the base. In this regard, as illustrated in FIG. 5, in some configurations the aperture 64 of the mounting pedestal 14 is smaller than the aperture 32 of the base 26, such that the entirety of the aperture 64 of the mounting pedestal 14 is visible or otherwise accessible through the aperture 32 of the base 26 In this regard, in some configurations the central axis 38 of the aperture 64 is substantially parallel to the central axis 68 of the aperture 64. As illustrate in FIG. 5, in some configurations, the central axis 38 of the aperture 64 is aligned with the central axis 68 of the aperture 64.

To assemble the first component 16 relative to the mounting clip 10, the user positions a portion of the first component 16 within the aperture 32 of the base 26 and within the aperture 64 of the mounting pedestal 14. In some configurations the first component 16 is a clip, such as a rosebud clip or a fir tree clip, secured to a wire harness 80 (e.g., an oxygen sensor wire harness). Positioning the first component 16 within the aperture 32 and within the aperture 64 will secure the first component 16 to the mounting pedestal 14. In this regard, it will be appreciated that the mounting clip 10 is secured between the mounting pedestal 14 and a portion of the first component 16 and/or the wire harness 80, such that the first component 16 prevents the mounting clip 10 from moving relative to the mounting pedestal along the X, Y, and Z-axes.

To assemble the second component 18 relative to the mounting clip 10, the user positions a portion of the second component 18 within the mounting feature 56 of the superior leg 24. In some configurations the second component 18 is a clip, such as a rosebud clip or a fir tree clip, secured to a wire harness 82. Positioning the portion of the second component 18 within the mounting feature 56 will secure the second component 18, and thus the wire harness 82, to the mounting clip 10.

Providing a mounting clip 10 formed from a resilient material and having a aperture 32 that is aligned with an aperture 64 formed in a support structure, such as a mounting pedestal 14 of an engine 12, allows the user to quickly mount both the mounting clip 10 and the first component 16 to the mounting pedestal 14, and further allows the user to mount the second component 18 to the mounting clip 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mounting clip for attachment to a mounting structure of a support structure, the mounting clip comprising:
    a base having a through hole and a catch, the catch adjacent a posterior side of the base, the base extending laterally between an inferior leg disposed on an anterior side of the base and a superior leg disposed on the posterior side of the base, the superior leg having a mounting aperture and a distal end of the inferior leg includes a barb that engages the mounting structure when the mounting clip is attached to the mounting structure;
    lateral support arms disposed on and extending along and from opposed lateral sides of the base wherein the lateral support arms extend downwardly from the base; and
    when the mounting clip is attached to the mounting structure the inferior leg extending downwardly from the anterior side of the base, the superior leg extending upwardly from the posterior side of the base, the inferior leg and the catch configured to engage the mounting structure and the through hole of the base opens to the aperture of the mounting structure allowing access to the aperture of the mounting structure through the through hole.

2. The mounting clip of claim 1, wherein the mounting clip is constructed from a resilient material.

3. The mounting clip of claim 2, wherein the resilient material includes a spring steel.

4. The mounting clip of claim 1, wherein the mounting clip is monolithically formed.

5. The mounting clip of claim 1, wherein the inferior leg and the catch are disposed on opposite sides of the mounting structure when the mounting clip is attached to the mounting structure.

6. A mounting assembly comprising:
    a mounting structure having a mounting feature;
    a mounting clip supported by the mounting structure, the mounting clip having a base with a through hole therein aligned with the mounting feature of the mounting structure wherein the mounting feature is accessible through the through hole, the base including a catch adjacent a posterior side of the base, the base extending laterally between an inferior leg disposed on an anterior side of the base and a superior leg disposed on the posterior side of the base, the superior leg having a mounting aperture, the inferior leg extending downwardly from the anterior side of the base and the superior leg extending upwardly from the posterior side of the base, the inferior leg and the catch configured to engage the mounting structure;
    a first component having a portion extending through the through hole and mounted to the mounting feature of the mounting structure; and a second component mounted to the mounting aperture of the superior leg.

7. The mounting assembly of claim 6 further including a wire harness attached to the first and second components.

8. The mounting assembly of claim 6, wherein the mounting feature of the mounting structure includes a second through hole in the mounting structure.

9. The mounting assembly of claim 8, wherein the through hole in the base of the mounting clip includes a first central axis, and the second through hole in the mounting structure includes a second central axis parallel to the first central axis.

10. The mounting assembly of claim 8, wherein a portion of the first component is disposed in the first and second through holes.

11. The mounting assembly of claim 6, wherein the mounting structure includes a portion of an engine.

12. The mounting assembly of claim 6, wherein the mounting clip is constructed from a resilient material.

13. The mounting assembly of claim 12, wherein the resilient material includes a spring steel.

14. The mounting clip of claim 6 further including lateral support arms disposed on and extending along and from opposed lateral sides of the base wherein the lateral support arms extend downwardly from the base.

15. The mounting clip of claim 14, wherein a distal end of the inferior leg includes a barb that engages the mounting structure.

* * * * *